United States Patent [19]
Lemaitre et al.

[11] Patent Number: 5,983,659
[45] Date of Patent: Nov. 16, 1999

[54] METHOD AND APPARATUS FOR EVACUATING BAD SMELLS FOR AN AIR CONDITIONING INSTALLATION FOR A MOTOR VEHICLE

[75] Inventors: Nathalie Lemaitre, Viroflay; Jacques Danieau, Noisy le Roi, both of France

[73] Assignee: Valeo Climatisation, La Verriere, France

[21] Appl. No.: 08/935,345

[22] Filed: Sep. 22, 1997

[30] Foreign Application Priority Data

Sep. 23, 1996 [FR] France .................................. 96 11564

[51] Int. Cl.$^6$ ............................ F25D 21/00; F25D 17/06; F24F 3/16
[52] U.S. Cl. ..................................... 62/272; 62/78; 62/89; 62/404
[58] Field of Search .............................. 62/239, 244, 78, 62/89, 186, 187, 272, 404

[56] References Cited

U.S. PATENT DOCUMENTS 3,850,003  11/1974  Beckwith et al. .......................... 62/82
4,677,902  7/1987  Takemasa .................................. 62/78 X Primary Examiner—William Doerrler
Attorney, Agent, or Firm—Morgan & Finnegan, L.L.P.

[57] ABSTRACT

An air conditioning installation for the cabin of a motor vehicle comprises an air treatment and distribution unit having an upstream chamber containing a fan and a downstream chamber containing distribution valves for distribution of treated air to the cabin. The two chambers are separated by an evaporator, through which air is driven by the fan into the downstream chamber. A collector for recovery of condensates is located below the evaporator and drains to outside the vehicle. The installation includes control means arranged to operate an automatic scavenging cycle immediately prior to the start of a period of air conditioning operation. This cycle consists in closing all the distribution valves and then running the fan for a predetermined scavenging period so as to drive the stale air out of the interior of the unit.

21 Claims, 1 Drawing Sheet

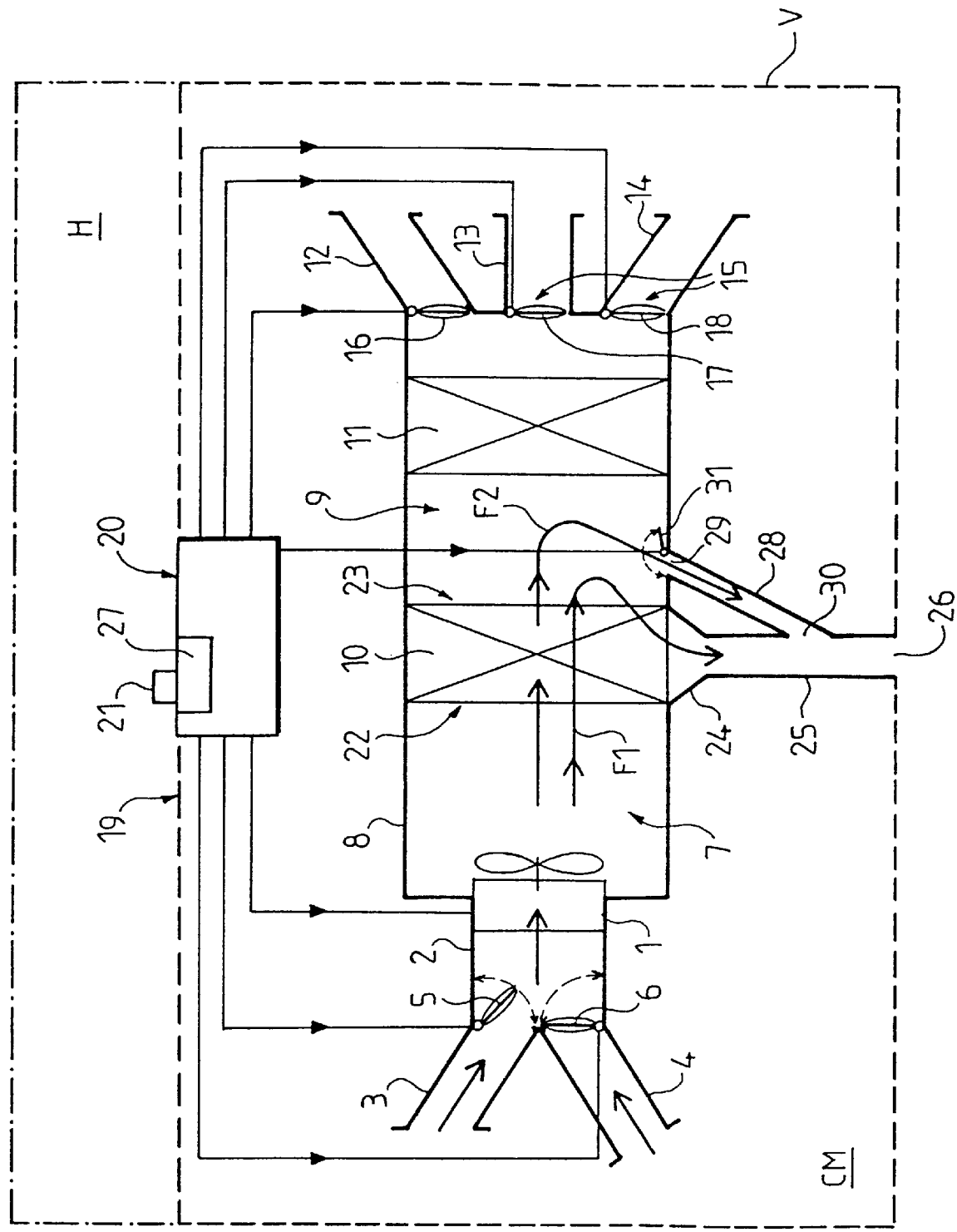

METHOD AND APPARATUS FOR EVACUATING BAD SMELLS FOR AN AIR CONDITIONING INSTALLATION FOR A MOTOR VEHICLE

FIELD OF THE INVENTION

This invention relates to air conditioning installations for motor vehicles, and more particularly an apparatus, and associated methods, for evacuating from such installations noxious odors, also referred to herein as bad smells.

BACKGROUND OF THE INVENTION

It is known to provide air conditioning installations which include a unit for treatment and distribution of air, in which the unit comprises an upstream chamber containing a motorised fan unit and a downstream chamber having distribution valves, the upstream and downstream chambers being separated from each other by an evaporator. A collector for recovering condensate is located below the evaporator. The collector terminates in an outlet which communicates with the outside of the vehicle in which the installation is fitted. The evaporator is arranged to cool a stream of air, which is driven towards the evaporator by the fan of the motorised fan unit and passes from the evaporator to be distributed, under the control of the distribution valves, into the cabin of the vehicle.

In passing through the evaporator, at least some of the humidity which is contained in the blown air stream is extracted from the latter, and collects in the form of condensates in the condensate collector. These condensates are then either treated in various ways known to the person skilled in this art, or they are evacuated outside the vehicle, or both. However, after the installation is turned off, some of the condensate still remains within the air treatment and distribution unit, and undergoes chemical or biochemical changes which tend to render the air which is stagnant within the treatment and distribution unit noxious. As a result, when operation of the air conditioning installation is eventually restarted, the noxious air is conveyed into the cabin of the vehicle, to the discomfort of the occupants.

DISCUSSION OF THE INVENTION

The object of the invention is to overcome the above mentioned drawback.

According to the invention in a first aspect, an air conditioning installation for the cabin of a motor vehicle, of the type comprising an air treatment and distribution unit having an upstream chamber, in which a motorised fan unit is mounted, and a downstream chamber having distribution valves, the said chambers being separated from each other by an evaporator, underneath which a recovery collector is located for collecting condensates produced by the evaporator, the recovery collector being terminated by an outlet or condensation drain in communication with the outside of the vehicle, the said evaporator being adapted to treat a stream of air delivered by the motorised fan unit with a view to the distribution of this air into the cabin under the control of the distribution valves, is characterised in that it further includes control means which are adapted so as, on the command of an occupant of the cabin indicating a requirement for the air conditioning installation to operate, to put all the distribution valves into a closed position, and then to cause the motorised fan unit to operate for a predetermined period of time whereby to evacuate, from the upstream and downstream chambers and through the said recovery collector, the air which is contained in the said chambers and any noxious matter contained in the said air. As a result, bad smells are removed outside the vehicle on each occasion when the air conditioning function of the installation is to be used, and before the air conditioning function is started.

In a preferred embodiment of the invention, the installation further includes a scavenging duct having a first end in communication with the downstream chamber, and a second end in communication with the condensate drain and/or directly with the outside, the scavenging duct being arranged to evacuate at least part of the air contained in the said upstream and downstream chambers during the predetermined period in which all of the distribution valves are closed. This arrangement increases the mass flow of air during the scavenging cycle in which the noxious matter is removed, and this leads to a reduction in the period of time during which the air conditioning function of the installation, though needed, cannot be used.

Preferably, the second end of the scavenging duct is open into the recovery collector.

In addition, a control valve, controlling access to the said first end of the scavenging duct, may be provided, this valve being adapted to be put by the control means, for a period of time which is at least equal to the said predetermined period of time for which the motorised fan unit operates during the preliminary scavenging operation, into an open position enabling air to be evacuated through the scavenging duct. This enables any reduction in the air mass flow of the installation to be avoided when it is operating outside the preliminary scavenging cycle.

In addition, where the installation includes a duct for feeding the motorised fan unit with air from outside the vehicle, and with recirculated air drawn through a recirculation duct, the fresh air duct and recirculation duct being controlled by a first inlet control valve and a second inlet control valve respectively, it is preferable that the control means be arranged to govern, at least during the said predetermined period, the respective settings of the first and second inlet valves in such a way that the motorised fan unit is supplied with fresh air from outside the vehicle only. Thus, after the preliminary scavenging cycle in which bad smells have been removed, the treated air which is distributed into the cabin will not be stagnant air taken from the cabin.

According to the invention in a second aspect, a method of evacuating bad smells from an air conditioning installation for the cabin of a motor vehicle, of the type comprising an air treatment and distribution unit having an upstream chamber, in which a motorised fan unit is mounted, and a downstream chamber having distribution valves, the said chambers being separated from each other by an evaporator, underneath which a recovery collector is located for collecting condensates produced by the evaporator, the recovery collector being terminated by an outlet or condensation drain in communication with the outside of the vehicle, the said evaporator being adapted to treat a stream of air delivered by the motorised fan unit with a view to the distribution of this air into the cabin under the control of the distribution valves, is characterised in that it includes a preliminary scavenging operation prior to distribution of treated air into the cabin, the scavenging operation consisting of putting all the distribution valves into a closed position, and then operating the motorised fan unit for a predetermined period of time so as to cause air in the upstream and downstream chambers, and any noxious matter contained in the said air, to be evacuated from the said chambers, and out of the vehicle, preferably at least partly through the recovery collector.

The scavenging operation preferably includes evacuation of at least some of the air contained in the said upstream and downstream chambers through a supplementary scavenging duct, having a first end open into the downstream chamber and a second end in communication with outside the vehicle.

Further features and advantages of the invention will appear more clearly on a reading of the following detailed description of a preferred embodiment of the invention, which is given by way of non-limiting example only and with reference to the accompanying drawing.

BRIEF DESCRIPTION OF THE DRAWING

The drawing consists of a single FIGURE showing diagrammatically part of an air conditioning installation according to the invention.

DESCRIPTION OF A PREFERRED EMBODIMENT OF THE INVENTION

The air conditioning installation shown in the drawing is in this example mainly contained within the engine compartment CM of a motor vehicle. The purpose of the installation is to produce the required atmospheric conditions within the cabin H of the vehicle. The vehicle, its cabin and its engine compartment are indicated diagrammatically in broken lines.

The air conditioning installation itself consists, in particular, of a motorised fan unit 1 which includes a fan supplied with air through a feed duct 2. The feed duct 2 draws air from outside the vehicle through a fresh air duct 3, and also draws air from the cabin H through a recirculation duct 4. The fresh air duct 3 has an inlet valve or control valve 5, and the recirculation duct 4 has an inlet valve or control valve 6. As shown in the drawing, these valves 5 and 6 are located at the downstream ends of these ducts, and consist here of flap valves.

When the fresh air control valve 5 is in its open position, the fresh air which flows in the fresh air duct 3 passes into a feed duct 2, whence it passes through the fan of the motorised fan unit 1, which delivers it into an upstream chamber 7 of an air treatment and distribution unit 8.

It will of course be understood that when the fresh air control valve 5 on the fresh air duct 3 is closed, but the control valve 6 on the recirculation duct 4 is in its open position, then the air which passes into the feed duct 2 consists entirely of air which has been drawn from inside the cabin H.

The air treatment and distribution unit 8 also has a downstream chamber 9. The upstream chamber 7 and the downstream chamber 9 are separated from each other by an evaporator 10, for cooling and/or de-humidifying the air that comes into the upstream chamber 7 of the unit 8. In this example the downstream chamber 9 also contains a heating radiator 11, for heating the air coming from the upstream chamber 7 when the air conditioning function of the installation is not in operation, that is to say when the installation is operating as a heating installation for the vehicle.

The air which is treated by the evaporator 10 or radiator 11 is distributed selectively into the cabin H of the vehicle through distribution ducts 12, 13 and 14, the respective first or outlet ends (not shown in the drawing) of which are open in selected locations within the cabin. The second or inlet ends 15 of these distribution ducts, i.e. the upstream ends of the latter, are open into the interior of the unit 8, generally downstream of the heating radiator 11. The upstream end of the distribution duct 12 contains a distribution control valve 16, and similarly the upstream ends 15 of the ducts 13 and 14 contain distribution control valves 17 and 18 respectively. The valves 16 to 18 are again in the form of flap valves in this example.

With this apparatus it is possible to determine and control the distribution into the cabin H of treated air from the unit 8, by selecting the relative positions of the distribution valves 16 to 18.

By way of example, the outlet end of the distribution duct is open into the cabin H at the level of the feet of the occupants of the vehicle, that of the duct 13 is open at the base of the windshield, and that of the duct 14 is open in the fascia, which is indicated diagrammatically at 19.

The inlet valves 5 and 6, together with the distribution valves 16, 17 and 18, are respectively controlled by a control module 20 which is arranged to govern the operation of the whole installation. The control module 20 includes suitable manually operated controls, indicated diagrammatically at 21, which generally project into the cabin H from the fascia panel 19, to enable one of the occupants, generally the driver or the front passenger, to set and adjust the various atmospheric parameters within the cabin of the vehicle.

In the air conditioning mode, due to the cooling of the air and/or the extraction of humidity performed by the evaporator 10, condensate tends to form, both on the outside walls of the tubes of the evaporator 10, over which the stream of air delivered by the fan of the fan unit 1 passes, and on the upstream face 22 and the downstream face 23 of the evaporator 10. Some of this condensate tends to fall towards the lower part of the evaporator 10 by gravity. It is therefore important to evacuate the condensate from inside the air treatment and distribution unit 8. For this purpose, the installation includes, underneath the evaporator 10, a recovery chamber 24 for collecting the condensate. In this example this chamber comprises a base element 24 in the form of a funnel, and a drain duct 25 which constitutes an extension of the base element 24. The drain duct 25 may if desired be connected to a reservoir (not shown in the drawing) for collecting the condensate for re-use. Alternatively or in addition, the drain duct 25 may be open as shown through a drain outlet 26 on the outside of the vehicle, so as to reject the condensate directly on to the road. In any case, there is direct atmospheric communication between the drain duct 25 and the outside.

That part of the condensate that is not evacuated through the funnel 24 may remain clinging to the evaporator 10. This causes micro-organisms or the like to grow inside the unit 8. As they multiply, these organisms give rise to unpleasant smells that become mixed with the air which is trapped within the upstream chamber 7 and the downstream chamber 9 of the unit 8 when the distribution valves 16 to 18 are closed, that is to say when the air cannot be released into the cabin H. As a result, when the installation is eventually put into operation, this air trapped within the unit 8 is distributed, together with its unpleasant smells, into the cabin H. The occupants of the vehicle are likely to find this objectionable.

In order to overcome this disadvantage, the installation is provided with control means 27, which are preferably included in the control module 20.

When one of the occupants of the vehicle operates one of the manually operated controls 21 on the control module 20, indicating to the module 20 that operation of the installation is to start, the control module 20 then addresses to the control means 27 a signal to initiate a scavenging operation (or cycle) by the control means 27, in which bad smells trapped in the unit 8 are evacuated before the installation is allowed to commence operating in accordance with the settings entered on the controls 21 by the occupant.

In order to enable this preliminary scavenging operation to take place, the control means 27 are so arranged as to take control of, in particular, the positioning of the distribution valves 16 to 18 which control access to the various distribution ducts 12 to 14. The control means 27 are also arranged to take control of the inlet valves 5 and 6 that control the intake to the feed duct 2. The preliminary scavenging operation then works as follows.

First, the control means 27 ensure that all the distribution valves 16 to 18 are in a closed position, so as to prevent any of the air trapped in the unit 8 from being evacuated from the latter through the distribution ducts 12 to 14. Preferably, a second step is now performed in which the control means 27 put the control valve 6 associated with the recirculation duct 4 into its closed position, and the fresh air inlet control valve 5 in an open position, so that only fresh air drawn from outside the vehicle can be received in the feed duct 2.

In the next step, the control means 27 initiate running of the motorised fan unit 1 for a predetermined period of time, which can be adjusted at will in accordance with the prevailing weather conditions. The stream of air which is driven by the fan from the feed duct 2 then passes into the upstream chamber 7 of the unit 8, and is passed through the evaporator 10 and into the downstream chamber 9. Because all of the distribution valves 16 to 18 are closed, the stream of air is forced to change course, and to flow towards the only available outlet in the unit 8, that is to say the condensate evacuation chamber 24. The direction of the flow of this air is indicated at F1 in the drawing. Thus, any air containing bad smells is forced out through the drain duct 25 and expelled outside the vehicle through the drain duct 25.

Once the predetermined period for this preliminary scavenging cycle has elapsed, the control means 27 automatically cease to operate, and the control of the motorised fan unit 1 and of the distribution valves 16 to 18 and inlet valves 5 and 6 is taken over by the control module 20 of the installation. The control module 20 then applies all of the settings of the atmospheric parameters which have been entered by the occupant using the controls 21. The control means 27 may for example include an electronic timer for generating the predetermined time period.

The installation preferably also includes a supplementary scavenging duct 28 for evacuation of the noxious air during the scavenging cycle, in order to increase substantially the mass flow of air in the preliminary scavenging cycle. In other words, the supplementary scavenging duct 28 can enable the period for which the motorised fan unit 1 operates during the preliminary scavenging cycle to be reduced.

The supplementary scavenging duct 28 has a first or upstream end which is open into the downstream chamber 9 of the unit 8, preferably between the evaporator 10 and the radiator 11, and a second or downstream end 30 which is in communication with the outside of the vehicle. Preferably the second end 30, or outlet, is open into the condensate drain duct 25. Thus, in this embodiment, the noxious air is removed through the duct 28 as well as through the funnel 24.

A scavenge valve 31 may be provided for controlling access to the supplementary scavenging duct 28, in the region of its first or inlet end for example. In this case, the scavenge valve 31 is controlled by the control means 27, which puts this valve selectively in an open position or a closed position. The scavenge valve is open at least during the whole of the predetermined operating period of the motorised fan unit 1 during the scavenging cycle, so as to enable the foul air to be evacuated. When the scavenge valve 31 is closed, this prevents air which has reached the downstream chamber 9 from being lost outside the vehicle after the scavenging operation, that is to say once the control means 27 have completed their operation (so that the control means 20 is now ready to set, or is applying, the required atmospheric parameters).

The invention is not limited to the embodiment shown in the drawing and described above, but embraces all variations which may be developed by a person skilled in this art within the scope of the Claims of this Application. Thus for example, the supplementary scavenging duct may be omitted. In addition, where this scavenging duct is provided, its inlet end communicating with the interior of the air treatment and distribution unit may be located in a different position from that shown in the drawing. It can be arranged that a scavenge valve of the type described above does not control the inlet end of the supplementary scavenging duct.

Finally, in the scavenging operation described above, the stream of air driven by the fan is fresh air drawn from outside the vehicle, but it can of course be arranged that a stream of air drawn from within the cabin, that is to say recirculated air, or a combination of fresh and recirculated air, is used.

What is claimed is:

1. An air conditioning installation for a cabin of a motor vehicle, comprising:

an air treatment and distribution unit defining an upstream chamber and a downstream chamber for receiving air from the upstream chamber;

a motorized fan unit in the upstream chamber;

a distribution valve in the downstream chamber;

an evaporator in the unit between the upstream chamber and the downstream chamber, whereby the motorized fan unit can drive a stream of air through the upstream chamber and the evaporator into the downstream chamber so that under the control of the distribution valve the air treated in the evaporator can be passed into the cabin of the vehicle; and a condensate recovery collector in communication with said chambers and disposed below the evaporator, to collect condensate from the evaporator, with a terminal drain outlet in at least atmospheric communication with outside the vehicle;

a manually operable control to indicate a requirement for operation of the installation; and a scavenge controller responsive to entry of an indication of said requirement by the manually operable controls, to energize the motorized fan unit, with the distribution valve closed, for a predetermined scavenging period to scavenge air from the chambers through the recovery collector.

2. An installation according to claim 1, further comprising:

a supplementary scavenging duct having an upstream end in communication with the downstream chamber and a downstream end in communication with outside the vehicle, for evacuating at least part of the air in the chambers during the predetermined scavenging period in which the distribution valve is closed.

3. An installation according to claim 2, wherein the downstream end of the scavenging duct is open into the recovery collector.

4. An installation according to claim 2, further comprising:
- a scavenge valve at the upstream end of the scavenging duct; and
- means connecting the scavenge valve with the scavenge controller;
- wherein the scavenge controller is adapted to have the scavenge valve open for a period of time at least equal to the predetermined scavenging period, whereby said evacuating can take place through the scavenging duct.

5. An installation according to claim 1, further comprising:
- a feed duct upstream of the motorized fan unit, for supplying air to the feed duct;
- a fresh air duct connected between the outside of the vehicle and the feed duct for supplying fresh air to the feed duct;
- a recirculation duct connected to the interior of the cabin and to the feed duct, for supplying air from the cabin to the feed duct;
- a first inlet control valve on the fresh air duct, for obturating the fresh air duct;
- a second inlet control valve on the recirculation duct, for obturating the recirculation duct; and
- means connecting the first and second inlet control valves with the scavenge controller;
- the scavenge controller adapted to govern the first and second inlet control valves during at least the predetermined scavenging period, whereby to open the first inlet control valve and close the second inlet control valve so that the motorized fan unit is supplied with fresh air only during scavenging.

6. A method for scavenging noxious matter from an air conditioning installation for a cabin of a motor vehicle having an air treatment and distribution unit defining an upstream chamber and a downstream chamber for receiving air from the upstream chamber; motorized fan unit in the upstream chamber; a distribution valve in the downstream chamber; an evaporator in the unit between the upstream chamber and the downstream chamber, whereby the motorized fan unit can drive a stream of air through the upstream chamber and the evaporator into the downstream chamber so that, under the control of the distribution valve, the air treated in the evaporator can be passed into the cabin of the vehicle; and a condensate recovery collector in communication with said chambers and disposed below the evaporator, for collecting condensate from the evaporator, the recovery collector with a terminal drain outlet in at least atmospheric communication with outside the vehicle, the method comprising:
- closing the distribution valve; and
- operating the motorized fan unit for a predetermined scavenging period so as to drive air and any noxious matter contained therein out of said chambers and out of the vehicle via the recovery collector.

7. A method according to claim 6, further comprising:
- providing a scavenging duct having an upstream end open into said downstream chamber and a downstream end in communication with outside the vehicle; and
- evacuating at least some of the air contained in said chambers through the scavenging duct.

8. A device comprising:
- a ventilation duct disposed to introduce conditioned air into an enclosure;
- a blower disposed within the ventilation duct;
- an evaporator within the ventilation duct, downstream of the blower;
- a condensate collector in communication with the ventilation duct, disposed to collect condensate from the evaporator;
- a drain outlet located on the condensate collector in communication with ambient air;
- a distribution valve downstream of the evaporator; and
- a scavenge controller connected to the distribution valve and the blower, to close said valve and to actuate the blower for a predetermined time before the air conditioning operation is begun, thereby to exhaust air remaining in the ventilation duct through the drain outlet.

9. The device according to claim 8, further comprising:
- a supplementary scavenging duct with an upstream end in communication with the ventilation duct at a point upstream of the distribution valve, and a downstream end in communication with the ambient air.

10. The device according to claim 9, wherein the upstream end of the scavenging duct is downstream of the blower.

11. The device according to claim 9, wherein the upstream end of the scavenging duct is downstream of the evaporator.

12. The device according to claim 9, wherein the downstream end is in direct communication with the condensate collector.

13. The device according to claim 9, wherein the downstream end is in direct communication with the drain outlet.

14. The device according to claim 9, further comprising:
- a scavenge valve within the supplementary scavenging duct connected to the scavenge controller;
- wherein the scavenge controller opens the scavenge valve during at least part of the predetermined time before the air conditioning operation is begun.

15. The device according to claim 14, wherein the scavenge valve is located at the upstream end of the scavenging duct.

16. The device according to claim 14, wherein the scavenge valve is located at the inlet of the scavenging duct.

17. The device according to claim 8, further comprising:
- a fresh air duct connected between the ambient air and the upstream end of the ventilation duct;
- a fresh air valve located within the fresh air duct connected to the scavenge controller;
- a recirculation duct connected between the cabin and the upstream end of the ventilation duct; and
- a recirculation valve located within the recirculation duct connected to the scavenge controller;
- wherein scavenge controller opens the fresh air valve and closes the recirculation valve during at least part of the predetermined time before the air conditioning operation is begun.

18. A device for evacuating odors from an air conditioning unit for a motor vehicle comprising:
- passage means for establishing fluid communication between an ambient atmosphere and an enclosure;
- means for generating a flow of air through the passage means;
- means for heat exchange adapted to condition the flow of air;
- means for collecting and evacuating condensate from the means for heat exchange;
- means for selectively interrupting the flow of air into the enclosure from the passage means; and means for exhausting air remaining within the ventilation duct for a predetermined time before the air conditioning operation is begun by simultaneously interrupting the flow of air into enclosure and generating a flow of air through the passage means and out through the means for collecting and evacuating condensate.

19. A motor vehicle comprising:

a passenger cabin;

an engine compartment; and an air conditioning installation for introducing conditioned air into the cabin, the installation further comprising the device according to claim 8.

20. A method comprising:

closing a distribution valve of an air conditioning system having a ventilation duct, a blower, an evaporator, a condensate collector with a drain outlet, and the distribution valve; and actuating the blower for a predetermined period to drive air and any noxious matter contained therein out of the ventilation duct.

21. A method according to claim 20, further comprising:

providing a scavenging duct having an upstream end in communication with the ventilation duct, downstream of the evaporator, and a downstream end in communication with the ambient air; and exhausting at least some of the air contained within the ventilation duct through the scavenging duct.

* * * * *